United States Patent [19]
Wright et al.

[11] 3,840,360
[45] Oct. 8, 1974

[54] METHOD OF THERMALLY CONDITIONING HOT MATERIALS

[75] Inventors: Donald Curtis Wright, Bolton; Kenneth Noel Hardcastle, Eccleston; Paul Arthur Brereton, Liverpool, all of England

[73] Assignee: Pilkington Brothers Limited, Liverpool, England

[22] Filed: July 7, 1972

[21] Appl. No.: 269,623

[30] Foreign Application Priority Data
July 9, 1971  Great Britain .................... 32453/71

[52] U.S. Cl. ................................. 65/119, 65/104
[51] Int. Cl. ............................................ C03b 25/04
[58] Field of Search ............. 65/104, 117, 118, 119

[56] References Cited
UNITED STATES PATENTS
3,337,317  8/1967  Ritter, Jr. .......................... 65/118 X
3,365,286  1/1968  Nedelec ............................... 65/114
3,607,198  9/1971  Meunier et al. .................. 65/119 X

*Primary Examiner*—Arthur D. Kellogg
*Attorney, Agent, or Firm*—Sughrue, Rothwell, Mion, Zinn and Macpeak

[57] ABSTRACT

Glass is annealed by conveying between water jackets having radiation absorbing surfaces adjacent opposite faces of the glass. Water is circulated through the jackets to keep the surfaces at a low enough temperature to achieve nett absorption of radiation from the glass. Hot gas is directed towards the glass faces through passageways extending through the water jackets. The hot gas forms controlled zones against opposite faces of the advancing glass so as to control the temperature gradient through the glass as it is annealed.

7 Claims, 9 Drawing Figures

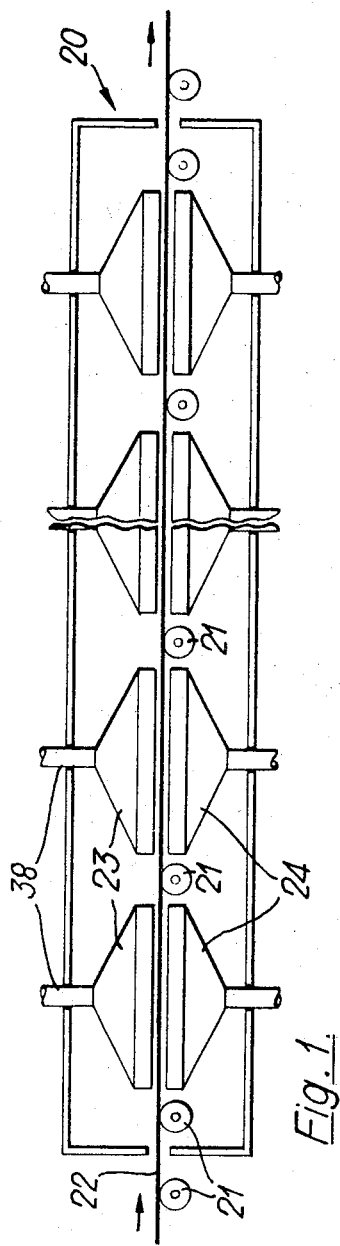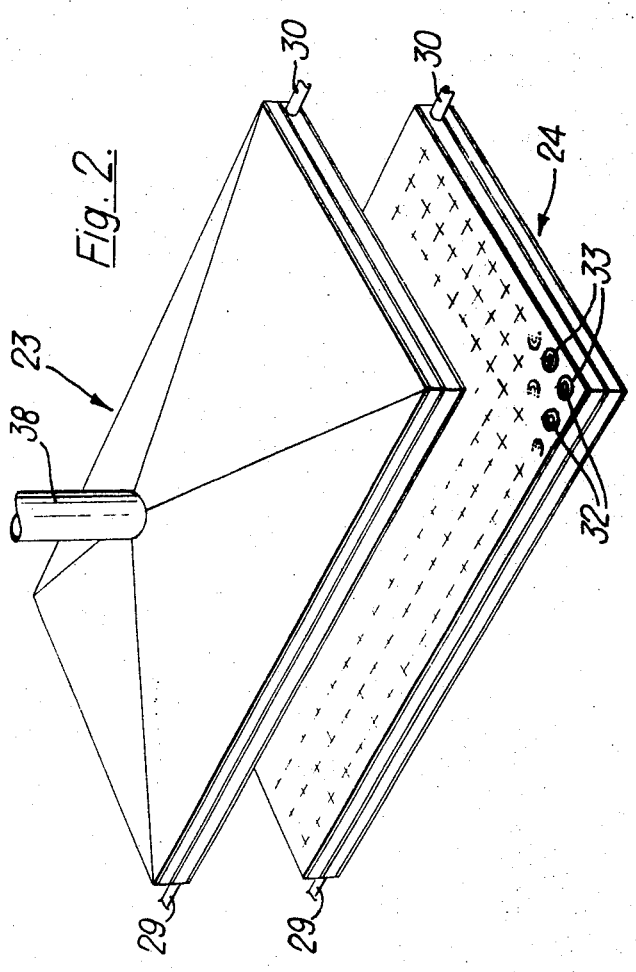

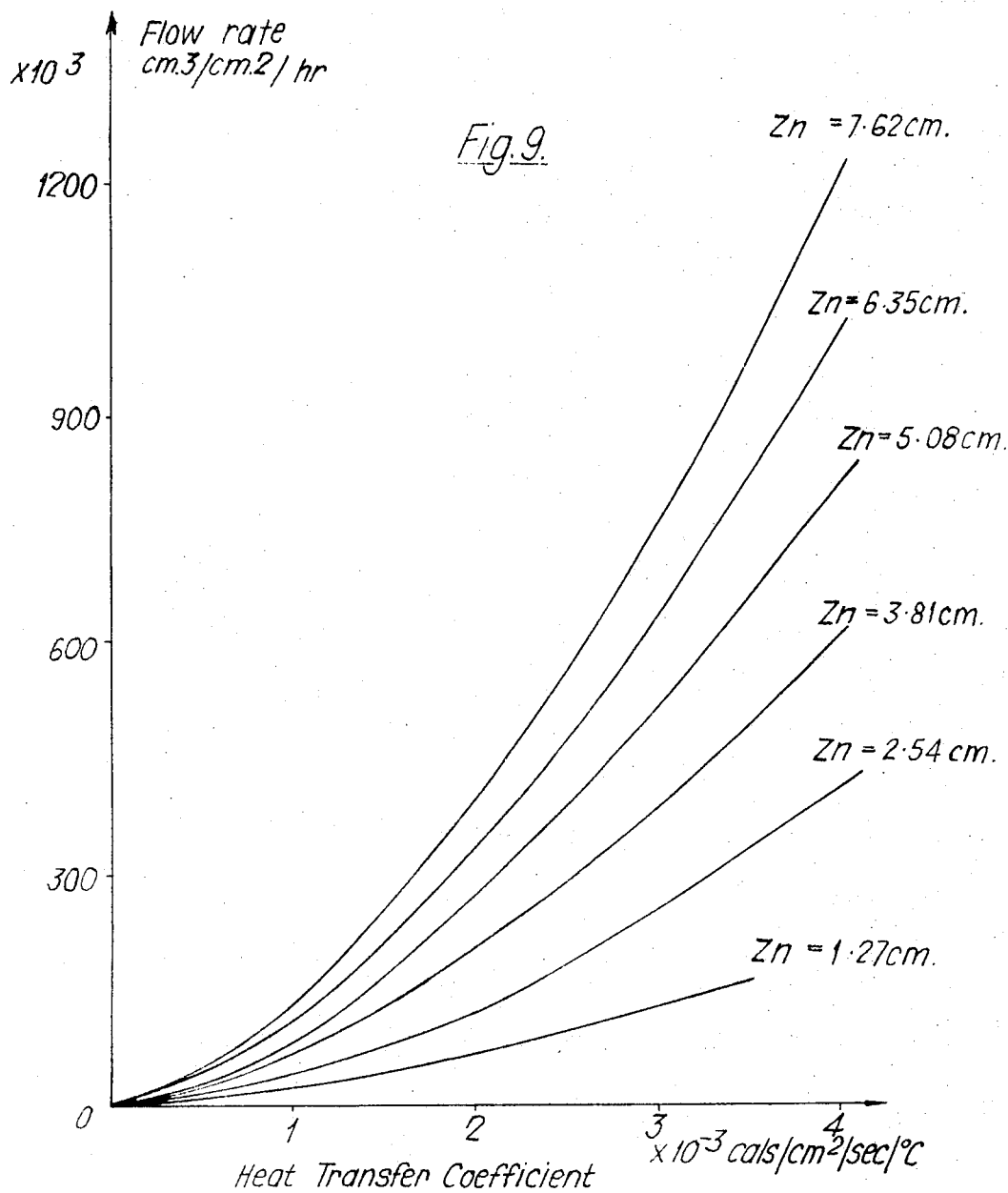

METHOD OF THERMALLY CONDITIONING HOT MATERIALS

BACKGROUND OF THE INVENTION

This invention relates to thermally conditioning hot materials. More particularly, but not exclusively, the invention relates to annealing glass. The glass being annealed may be, for example, in the form of glass sheets, or drawn glass sheet or a float glass ribbon.

In the manufacture of drawn glass sheet, it is known to anneal the glass by passing the hot glass sheet between vertical walls designed to cool the sheet by radiation. In such a process the walls may comprise water jackets which cool the sheet by radiation and maintain the glass surface temperature substantially below the temperature of the glass centre. This temperature gradient through the glass thickness usually results in the annealed glass having a surface compressive stress.

In another process it is known to pass vertically drawn glass sheet between heater elements which counteract the cooling of the glass. In this case, the heater elements heat the glass throughout its thickness. It is also known to apply the process to a horizontal annealing lehr.

SUMMARY OF THE INVENTION

According to the invention a method of controlling, during cooling, the thermal condition of hot material in sheet-like form which emits thermal radiation from below its surface, comprises presenting a radiation absorbing surface to the material, maintaining that surface at a temperature at which there is a nett absorption of radiation from the material, developing at least one zone of hot gas flow against the material surface, which gas supplies heat to the material surface, and regulating the heat transfer between the material surface and the hot gas and thereby the temperature gradient existing through the material as it cools.

The material is glass or other material, e.g. perspex, which emits thermal radiation significantly at a selected processing temperature and permits transmission of radiation from the interior of the material.

The invention also provides a method of annealing glass in sheet or ribbon form, comprising advancing the glass, initially near to a temperature at the upper end of the annealing range, between radiation absorbing surfaces, maintaining the surfaces at a temperature at which there is a nett absorption of radiation from the glass, developing zones of hot gas flow against the opposite faces of the advancing glass, which gas supplies heat to the glass faces, and regulating the heat transfer between the glass faces and the hot gas and thereby the temperature gradient existing through the thickness of the glass as it is annealed.

This regulation of the temperature gradient allows control of the form and degree of the stress in the glass after annealing.

Preferably the zones of hot gas provide a progressively lower temperature in the direction of advance of the glass.

The zones of hot gas may provide a changing degree of heat transfer across the width of the advancing glass.

The invention also provides apparatus for annealing glass in sheet or ribbon form, comprising conveying means for advancing glass which is initially near to a temperature at the upper end of the annealing range, radiation absorbing surfaces located adjacent the path of the conveying means so as to face opposite faces of the glass, means for maintaining the absorbing surfaces at a temperature at which there is a nett absorption of radiation from the glass, and means for developing controlled zones of hot gas flow against the opposite faces of the advancing glass, so that the gas may supply heat to the glass faces and regulate the heat transfer between the glass faces and the hot gas and thereby the temperature gradient through the thickness of the glass as it is annealed.

Preferably the radiation absorbing surfaces are provided by water jackets between which the glass is advanced, means being provided for circulating water through the water jackets to maintain said radiation absorbing surfaces at a temperature at which there is a nett absorption of radiation from the glass.

Preferably passageways extend through the radiation absorbing surfaces, which passageways are connected to hot gas supply means. There may also be exhaust passageways intermediate said gas supply passages to assist control of the heat transfer between the glass faces and the hot gas.

BRIEF DESCRIPTION OF THE DRAWINGS

FIG. 1 is a side elevation of an annealing lehr for a flat glass ribbon, one outer side wall of the lehr being removed;

FIG. 2 is an exploded perspective view of one pair of the combined heating and cooling units of the lehr shown in FIG. 1;

FIG. 9 is a graph showing different conditions of the hot gas.

DESCRIPTION OF THE PREFERRED EMBODIMENT

The subject of this example is an annealing lehr for a flat glass ribbon taken from a bath of molten metal. The ribbon is formed of soda-lime-silica glass and leaves the molten metal at a temperature of about 650°C. The hot glass is then passed through an annealing lehr to control the stress formation in the glass. During the annealing process the glass cools to a temperature of about 450°C and normally emerges with a small degree of surface compressive stress. The provision of this stress improves the cutting and handling properties of the glass. However, as discussed above, it may be desired to produce glass with zero surface stress or even tensile surface stress.

This invention concerns the production of thermally conditioned glass having a desired form and value of surface stress and an annealing lehr for achieving this will now be described.

Figure 3:
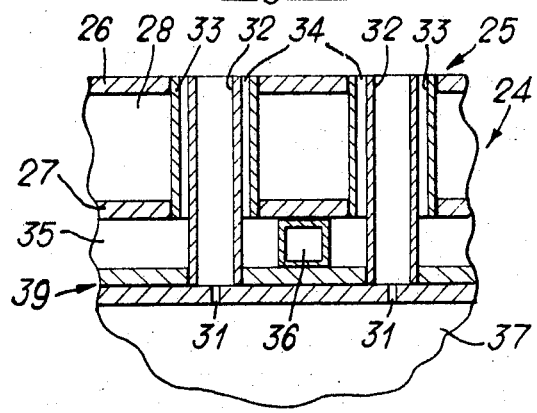
FIG. 3 is an enlarged partial section through one of the combined heating and cooling units of the lehr shown in FIG. 1.

Referring to FIGS. 1 to 3, the annealing lehr 20 has a plurality of rollers 21 spaced apart along the length of the lehr for supporting a flat glass ribbon 22 advanced therethrough. In between each pair of adjacent rollers 21 is a pair of combined cooling and heating units 23, 24. These units 23, 24 are disposed one above the other in spaced apart relation and in face-to-face relation with the upper and lower faces of the glass ribbon respectively. Also, in this embodiment, each unit extends across the full width of the glass ribbon 22.

As shown most clearly in FIGS. 2 and 3, each unit 23, 24 comprises a water jacket 25 having walls 26, 27 defining a space 28 and inlet and outlet pipes 29, 30 whereby water may be passed continuously through the space 28. The wall 26 of the water jacket 25 comprises the outer surface of the respective unit which faces the glass ribbon 22. The water cooled jacket is maintained at a temperature less than 100°C, and thereby constitutes a surface which absorbs nett radiation from the glass.

On the remote side of the water jacket 25 from the glass there is a plenum chamber 37 for hot gas, the chamber being connected to hot gas, e.g. hot air, supply means by a pipe 38 and having a wall 39 connected to the outer wall 27 of the water jacket by spacers 36. Within this wall 39 are nozzles 31 leading to a plurality of open-ended passageways 32 which pass through apertures 33 in the water jacket 25. A zone or cushion of hot gas is thereby developed between the unit and the glass. The passageways 32 and the apertures 33 define annular spaces 34 which lead to the space 35 between the walls 27, 39 and which if desired form exhaust passageways and an exhaust chamber respectively.

Each unit 23, 24 thereby comprises a combined cooling and heating unit which absorbs radiation from the glass and simultaneously convectively supplies heat to the glass surfaces. During this annealing process the glass, unless otherwise controlled, would cool with its centre hotter than its surfaces. It is this temperature gradient which determines any stress in the glass at the completion of the annealing process.

The provision of the units 23, 24 allows the heat transfer with the glass to be regulated and thereby the temperature gradient to be controlled. Hence the form and degree of stress is controlled. This control is established primarily by controlling the rate of flow and temperature of the hot gas issuing from the passageway 32 of the units 23, 24. In any particular case, the desired temperature gradient through the thickness of the glass is selected, for example a 2° gradient with the glass surfaces being 2° cooler than the glass centre, and then the corresponding rate of flow and temperature of gas is employed for each pair of units 23, 24 which will maintain this selected 2° temperature gradient throughout the full length of the annealing range.

It will be appreciated that the water jackets absorb radiation and do not significantly emit radiation. Hence the amount of radiation transmitted to the glass is minimised compared with that in known methods of annealing. The hot gas thus supplies heat to the glass surfaces to the extent required to maintain the selected temperature gradient. Consequently, each pair of units 23, 24 is supplied with gas at a different temperature, the gas temperature from successive units decreasing down the lehr, i.e. in the direction of advance of the glass. In this example, the pipes 38 of each pair of units 23, 24 are connected to an individual gas supply for supplying gas at the required temperature. However, two or more pairs of units may be connected to a common gas supply at the highest temperature desired, the gas then being lowered in temperature to the particular temperature required for each pair of units by dilution with cooler gas. Alternatively, the common gas supply could be at the lowest temperature desired, the gas then being raised in temperature to the temperature required for each pair of units by respective heaters.

Figure 4:
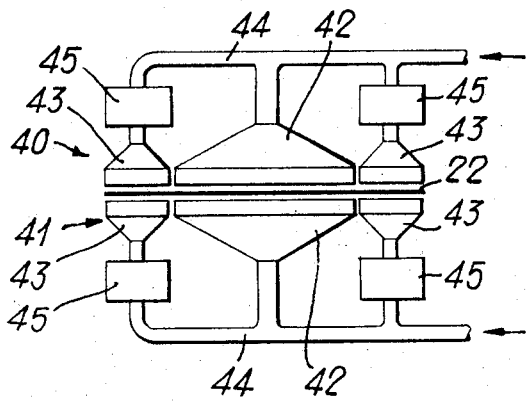
FIG. 4 is an end elevation of another pair of combined heating and cooling units, with a flat glass ribbon passing between the units.
Figure 5:
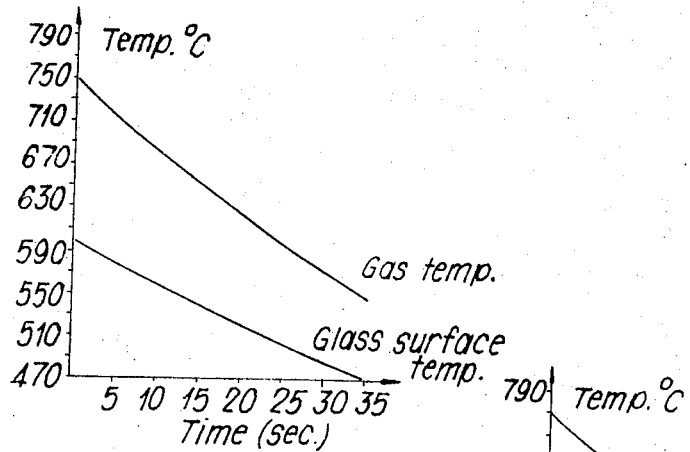
FIGS. 5 to 8 are graphs of the results of four examples of annealing glass.
Figure 7:
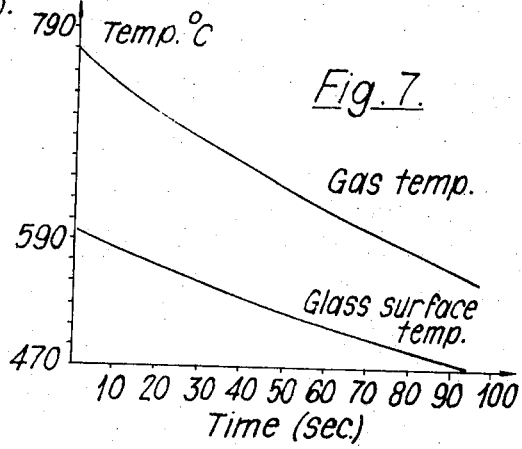
Figure 6:
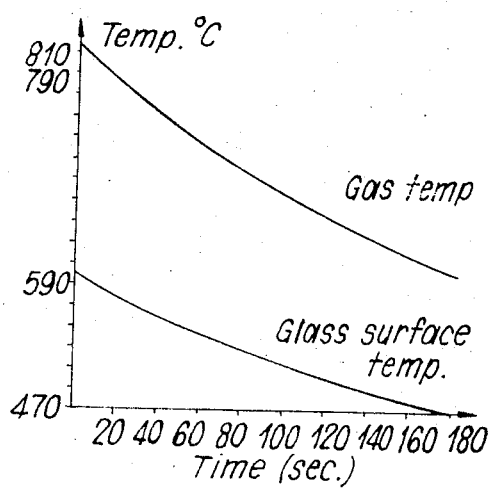
Figure 8:
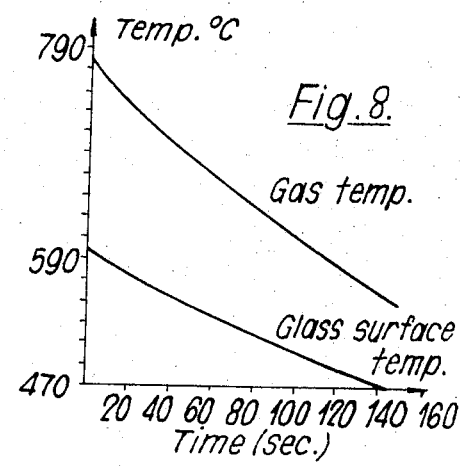

Referring to FIG. 4, there is shown a pair of combined cooling and heating units of another annealing lehr. These units 40, 41 are precisely the same as the previous units 23, 24 except that they are divided into three units or compartments 42, 43 across the width of the advancing glass ribbon 22. The central compartments 42 lie adjacent the centre portion of the glass ribbon and the outer compartments 43 lie adjacent the edge portions of the glass ribbon. Each compartment develops its respective zone of hot gas to supply heat to the glass surface, but, at least in this example, each compartment of the same unit is connected to a common gas supply pipe 44 for supplying gas at a temperature required for the central compartment 42. The gas supplied to each outer compartment 43 is increased in temperature by a heater 45. This method of developing zones of hot gas at different temperatures across the width of the glass ribbon, in addition to longitudinally of the ribbon, may be desirable to counteract any tendency for the peripheral areas to cool at a faster rate than the centre area of the glass and the creation of a surface temperature gradient across the width of the glass ribbon.

In present methods of annealing a flat glass ribbon, the glass cools at a given rate which will vary with the thickness of the glass. However, for a given thickness and resultant stress, the glass may be annealed by use of this invention in a shorter time. This enables either the use of a shorter lehr or permits a higher throughput from existing lehr lengths. Reference is made to Table I giving, by way of example, production speeds of flat glass ribbons of different thicknesses and corresponding cooling rates obtainable during annealing both with a known method and a method according to this invention, both methods giving the same final stress.

TABLE I

| glass thickness mm | rate of production cm/minute | average cooling rate °C/sec | |
|---|---|---|---|
| | | standard | this invention |
| 2 | 1524 | 1.7 | 4.0 |
| 3 | 127 | 1.6 | 3.0 |
| 6 | 610 | 0.4 | 1.4 |
| 10 | 356 | 0.18 | 0.9 |

For the production of glass according to the invention having a lower surface compressive stress, zero surface stress, or even a tensile surface stress, then the cooling rate will be progressively less.

FIGS. 5 to 8 are graphs of four different examples showing, in each case, the progressive decrease of temperature of the hot gas and the glass surface in the direction of advance along an annealing lehr shown in FIGS. 1 to 3, for a given thickness of glass ribbon, temperature gradient through the thickness of glass, temperature of radiation absorbing surface, and heat transfer coefficient between the hot gas and the glass surface. These predetermined conditions for the four examples are quoted in Table II, the temperature gradient being in each case the amount the temperature of the glass surface is below that of the glass centre. Also Table III gives various temperatures taken from the graphs of FIGS. 5 to 8, of the hot gas and the glass surface, after various times in the annealing periods.

TABLE II

| Example No. | Figure No. | Thickness of glass in mm | Temperature gradient of glass °C | Temperature of radiation absorbing surfaces °C | Heat transfer coefficient between hot gas and glass surface cal/cm².sec.°C | Average cooling rate °C/sec |
|---|---|---|---|---|---|---|
| 1 | 5 | 2 | 2 | 30 | 0.002 | 4.0 |
| 2 | 6 | 6 | 0 | 50 | 0.002 | 0.8 |
| 3 | 7 | 6 | 6 | 50 | 0.002 | 1.4 |
| 4 | 8 | 10 | 10 | 100 | 0.002 | 0.9 |

TABLE III

| Example No. | Time into annealing schedule (sec) | Temperature of gas °C | Temperature of glass surface °C |
|---|---|---|---|
| 1 | 0 | 748 | 600 |
|   | 5 | 713 | 580 |
|   | 20 | 622 | 520 |
|   | 30 | 572 | 488 |
| 2 | 0 | 816 | 600 |
|   | 40 | 750 | 560 |
|   | 80 | 698 | 528 |
|   | 120 | 656 | 500 |
| 3 | 0 | 772 | 600 |
|   | 20 | 710 | 568 |
|   | 40 | 662 | 538 |
|   | 80 | 582 | 488 |
| 4 | 0 | 780 | 600 |
|   | 40 | 700 | 558 |
|   | 80 | 640 | 522 |
|   | 120 | 586 | 490 |

Reference is now made to FIG. 9 which relates to the conditions which may be selected for the hot gas. FIG. 9 comprises a graph of the flow rate of the gas against its heat transfer coefficient for different values of Zn, where Zn equals the distance between the glass surface and the adjacent ends of the passageways 32. In each case the gas is air at a temperature of 700°C, and the passageways have a diameter of 3.17 millimeters and are spaced 25.4 millimeters apart.

If desired the support rollers 21 of the annealing lehr 20 may be omitted and the glass ribbon 22 may be supported on a gaseous cushion comprising the zones of hot gas developed by the lower units 24, the hot gas thereby acting additionally as a gas hearth for the glass.

By way of example, the invention may be applied to the cooling or annealing of float, flat drawn, rolled glass, or to separate glass sheets.

Furthermore, the invention is not restricted to cooling the glass through the annealing range only but may be applied to hotter glass resulting in faster rates of cooling given specific parameters. For example, if a resultant stress level corresponding to a temperature difference of 10°C (the glass surface being 10°C below the glass centre) is acceptable, then 6 mm thick soda-lime-silica glass may be cooled in accordance with this invention from, for example, 1000°C to 450°C. The cooling rate will vary with glass temperature and approximate values are given in Table IV.

TABLE IV

| Glass surface temperature °C | Average cooling rate °C/sec |
|---|---|
| 1000 | 7 |
| 800 | 4.5 |
| 600 | 2.5 |
| 550 | 2.1 |
| 500 | 1.9 |
| 450 | 1.7 |

As explained above with reference to Table I, this invention as compared with known methods, allows the operator to achieve faster cooling or annealing, i.e. increased throughput, or alternatively employ a shorter lehr length, whilst maintaining the same temperature gradient through the glass. It is also possible for the operator to obtain a reduced final stress for the same cooling or annealing time of known methods.

A further advantage of the apparatus of this invention is that when a changeover is made to another glass thickness, the change to the desired thermal conditions can be effected more quickly.

The above embodiments are each concerned with the controlled cooling or annealing of glass. However, the invention may also be applied to controlling the thermal condition of other material during cooling, which material, e.g. acrylic resin, emits thermal radiation significantly at a selected processing temperature. It will be appreciated that it is necessary for the material to be at least semi-transparent to infra-red radiation to permit radiation to be transmitted through the material from the interior.

We claim:

1. A method of controlling, during cooling, the thermal condition of hot material in sheet-like form which emits thermal radiation from below its surface, comprising presenting a radiation absorbing surface to the material, maintaining that surface at a temperature at which there is a nett absorption of radiation from the material, developing at least one zone of hot gas flow against the material surface, the gas being heated to a temperature above the surface temperature of the material whereby the gas supplies heat to the material surface, and regulating the heat transfer between the material surface and the hot gas and thereby the temperature gradient existing through the material as it cools.

2. A method of annealing glass in sheet or ribbon form, comprising advancing the glass, initially near to a temperature at the upper end of the annealing range, between radiation absorbing surfaces, maintaining the surfaces at a temperature at which there is a nett absorption of radiation from the glass, developing zones of hot gas flow against the opposite faces of the advancing glass, the gas being heated to a temperature above the surface temperature of the glass whereby the gas supplies heat to the glass faces, and regulating the heat transfer between the glass faces and the hot gas and thereby the temperature gradient existing through the thickness of the glass as it is annealed.

3. A method according to claim 2 for annealing soda-lime-silica glass, including maintaining the radiation absorption surfaces at a temperature below 100°C.

4. A method according to claim 2, wherein the glass, during its advance between said radiation absorbing surfaces, is supported on a succession of transverse rollers disposed alternately with said zones of hot gas flow developed against the lower face of the glass.

5. A method according to claim 2, wherein the glass is advanced between zones of hot gas forming opposed gaseous cushions, the lower cushion supporting the glass during its advance.

6. A method according to claim 2, wherein the zones of hot gas provide a progressively lower temperature in the direction of advance of the glass.

7. A method according to claim 2, wherein the zones of hot gas provide a changing degree of heat transfer across the width of the advancing glass.

* * * * *